Sept. 12, 1961 R. C. MOYER 3,000,005

OFF-CENTER INDICATOR

Filed Oct. 29, 1957 2 Sheets-Sheet 1

INVENTOR.
Robert C. Moyer
BY Morris A. Rabkin
ATTORNEY.

Sept. 12, 1961 R. C. MOYER 3,000,005

OFF-CENTER INDICATOR

Filed Oct. 29, 1957 2 Sheets-Sheet 2

INVENTOR.
Robert C. Moyer
BY Morris Rabkin
ATTORNEY.

United States Patent Office 3,000,005

Patented Sept. 12, 1961

3,000,005
OFF-CENTER INDICATOR

Robert C. Moyer, Indianapolis, Ind., assignor to Radio Corporation of America, a corporation of Delaware Filed Oct. 29, 1957, Ser. No. 693,160
2 Claims. (Cl. 340—282)

Figure 1:
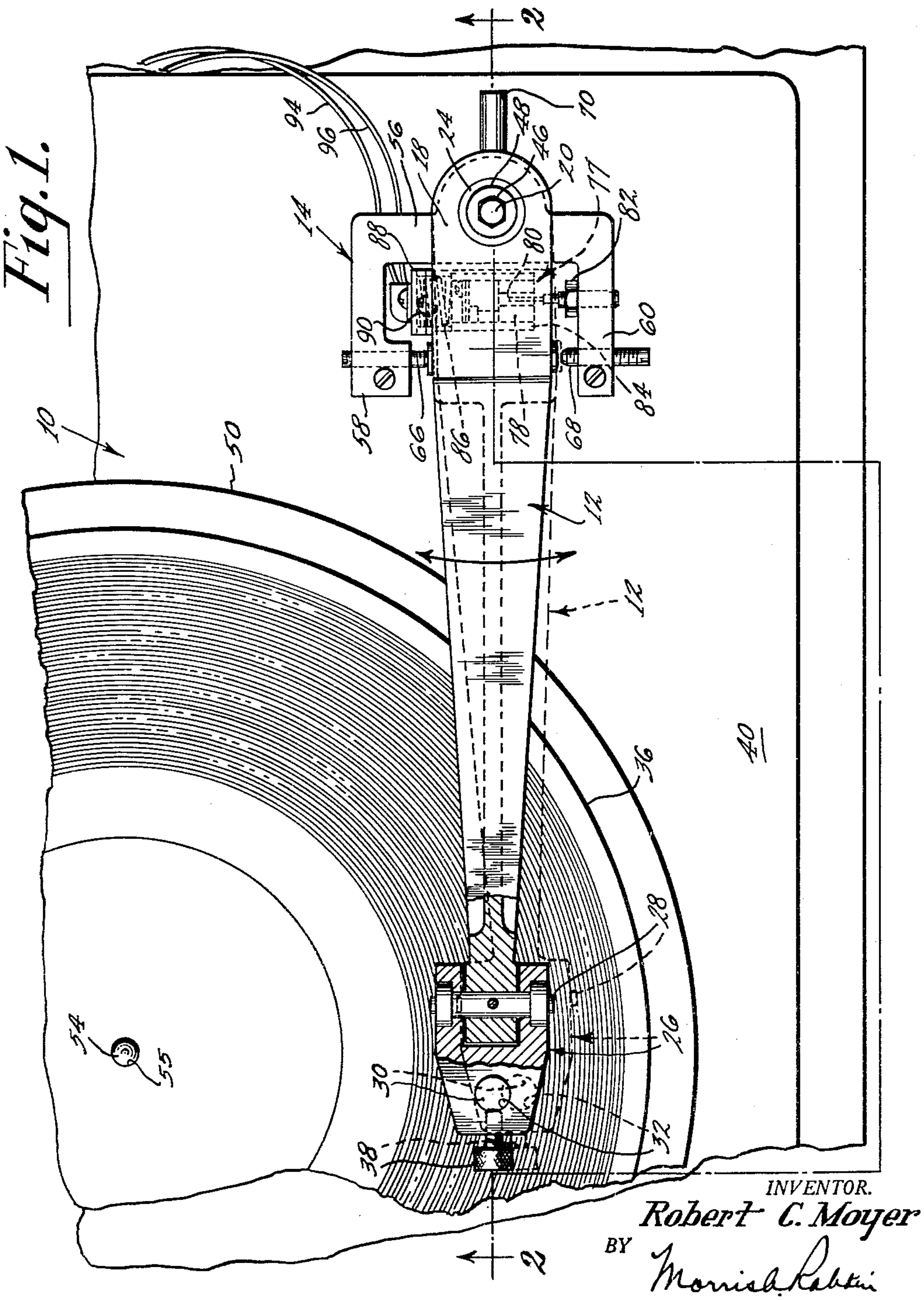

This invention relates to off-center indicators, and more particularly to an off-center indicator of the type adapted to check the concentricity of disc phonograph records and metal phonograph stampers.

The off-center indicator of the present invention is particularly useful for measuring the amount of back-up of a tone arm due to the eccentricity of the recording spiral of a phonograph record or metal phonograph stamper.

In producing a metal phonograph stamper, the center hole is obliterated during the plating process. It is, therefore, necessary to punch a center hole in each metal phonograph stamper. If the punched hole is not substantially concentric with the recording spiral on the stamper, within permissible tolerances, the records produced from the stamper will exhibit the objectionable characteristics of wow.

Accordingly, it is an object of the present invention to provide an improved off-center indicator of the type adapted to indicate the back-up of a tone arm on a disc phonograph record or on a metal phonograph stamper resulting from any eccentricity of the recording spiral with respect to a punched center hole.

Another object of the present invention is to provide an improved off-center indicator that will give a steady indication while the tone arm is traveling toward the center of the record, and give an indication of back-up when the tone arm is traveling toward the outer edge of the record due to the eccentricity thereof.

A further object of the present invention is to provide an improved off-center indicator that is relatively simple in construction and operation, and is highly efficient in use.

These objects and related advantages of the present invention are attained in an improved off-center indicator comprising a tracer means, for example, a tone arm, and a follower arm cooperating with the tracer means. One end of the tone arm and one end of a follower arm are pivotally mounted on a fixed shaft for rotation thereabout. The follower arm is disposed to be in contact with the tone arm in a manner whereby the tone arm will push the follower arm while moving inwardly toward the center of a record. The follower arm is friction loaded on the shaft so that it will remain stationary in the event the tone arm backs up due to a condition of eccentricity of the recording spiral of the record. A short, stiff, bristle brush is used in place of the usual needle in the tone arm so that the tone arm will follow the ridges of the spiral recording on a metal stamper, as well as the grooves in a disc phonograph record. A coil may be fixed to the tone arm, and a core may be fixed to the follower arm in a manner to cooperate with the coil whereby to influence its inductance. The coil is connected to an oscillator whose frequency is determined, at least in part, by the inductance of the coil. The output of the oscillator is connected to a detector of any suitable means, such as a frequency counter. The output of the detector may be a calibrated meter to indicate directly, in units of length, the displacement of the coil with respect to the core.

Figures 2, 3:
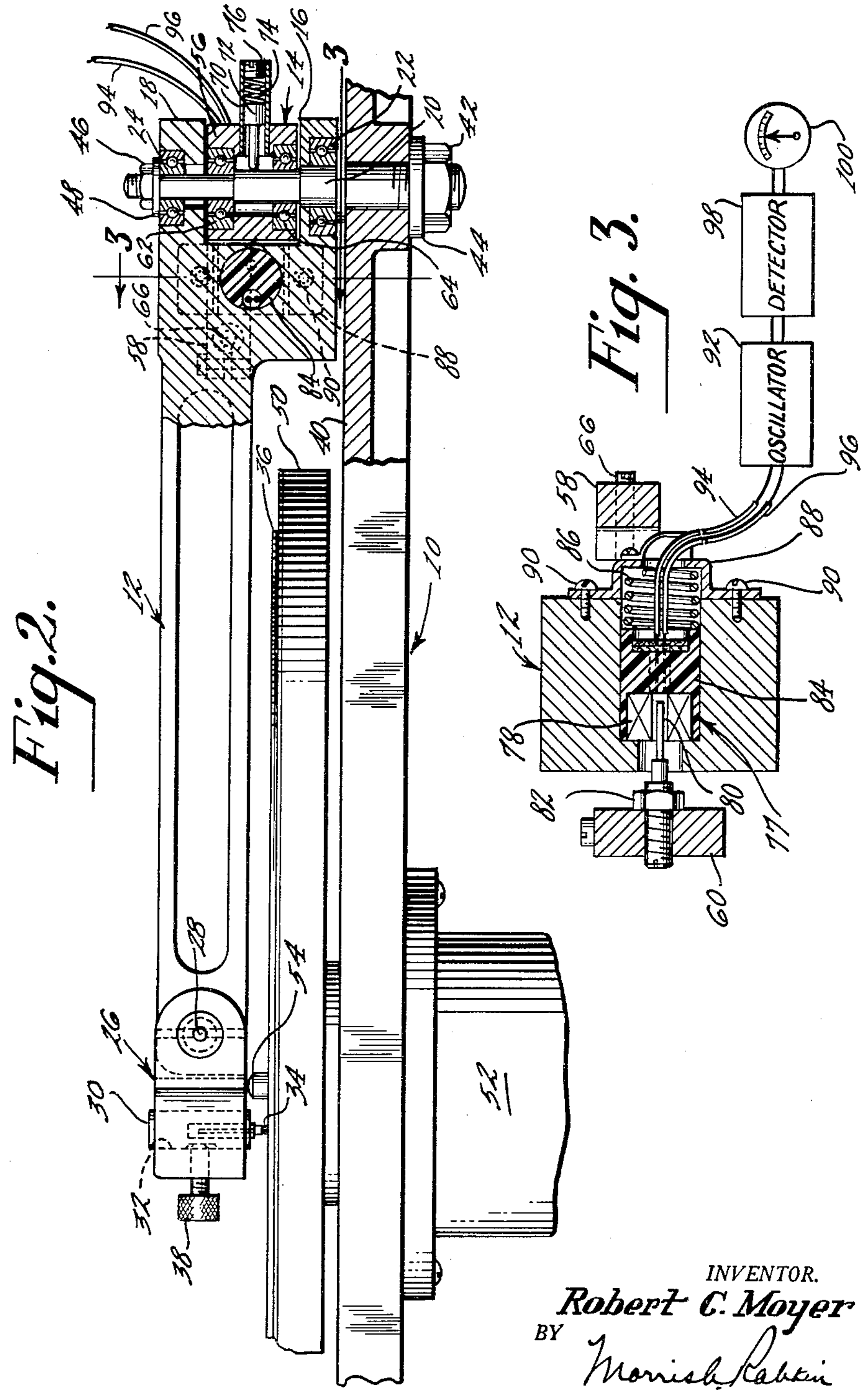

The novel features of the present invention, as well as the invention itself, both as to its organization and method of operation, will be understood in detail from the following description, when considered in connection with the accompanying drawing, in which similar reference characters represent similar parts, and in which:

FIG. 1 is a plan view of the off-center indicator, in accordance with the present invention, showing some portions in fragmentary section;

FIG. 2 is a side elevational view of the off-center indicator, with a portion shown as a cross-sectional view taken along the plane 2—2 in FIG. 1 as viewed in the direction of the arrows and other portions being shown as fragmentary sections; and FIG. 3 is a cross-sectional view taken along the plane 3—3 in FIG. 2 as viewed in the direction of the arrows, and some portions of the apparatus being indicated in block diagram form.

Referring now to FIGS. 1 and 2, there is shown an off-center indicator 10 comprising a tone arm 12 and a follower arm 14. The rear end of the tone arm 12 is bifurcated, having two spaced apart and vertically aligned extensions 16 and 18. The tone arm 12 is pivotally mounted on a shaft 20 by means of ball bearings 22 and 24 in the extensions 16 and 18, respectively. The tone arm 12 is mounted for rotation about the shaft 20 in a plane perpendicular thereto.

The front end of the tone arm 12 has a brush holder 26 pivoted thereto, by means of a swivel pin 28, for rotation in a plane perpendicular to the plane of rotation of the tone arm 12. A brush 30 is disposed within a vertically drilled hole 32, in the brush holder 26, so that its short, stiff bristles 34 will be disposed above a record 36. The brush 30 may be clamped in a fixed position by means of a screw 38.

The shaft 20 extends upwardly from an upper base 40, and is fixed thereto by any suitable means, as by a nut 42 and a washer 44. The ball bearing 24 between the upper extension 18, of the tone arm 12, and the shaft 20 is held in place by a nut 46 and a washer 48. A turntable 50 is disposed above the upper base 40, and is adapted to rotate in a substantially horizontal plane. The turntable may be rotated by any suitable reversible motor, as for example a reversible motor 52.

The record 36, whose spiral recording is to be tested for eccentricity, is disposed so that a spindle 54, extending upwardly from the turntable 50, passes through the hole 55 of the record 36.

The follower arm 14 is a U-shaped component having a center part 56 and a pair of substantially parallel, forward extensions 58 and 60. The follower arm 14 is pivotally mounted for rotation about the shaft 12 by means of vertically aligned ball bearings 62 and 64, between the center part 56 of the follower arm 14 and the shaft 20. An adjustable stop 66 is threadably inserted in the forward extension 58 in a manner to contact the tone arm 12. It will now be understood that as the tone arm 12 moves inwardly toward the center of the record 36, the tone arm 12 will push the follower arm 14, whereby the latter will rotate about the shaft 20. A stop 68 is threadably engaged with the forward extension 60, of the follower arm 14, but is spaced from the tone arm 12. The purpose of the stop 68 is to limit the movement of the follower arm 14 with respect to the tone arm 12.

Means are provided to load the follower arm 14 frictionally so that it will move only when driven by the tone arm 12, and will remain fixed in the absence of any force upon it. To this end, a tube 70 is fixed within an opening in the center part 56 of the tone arm 14. A plunger 72 is slidably disposed within the tube 70 in a manner whereby its forward end touches the shaft 20. The plunger 72 is urged against the shaft 20 by means of a spring 74 between the plunger 72 and a slotted screw 76. The screw 76 is in threaded engagement with the inner wall of the tube 70. It will now be understood that the friction loading of the follower arm 14 may be adjusted by turning the slotted screw 76.

Means are provided to indicate when the follower arm 14 is separated from the tone arm 12, as when the tone arm 12 backs up due to the eccentricity of the recording spiral of a record or a stamper. To this end, an electrical component, such as an inductor 77, comprising a coil 78 and a core 80 is employed. The coil 78 is disposed within the tone arm 12. The iron core 80 is fixed to the forward extension 60, by any suitable means, as by a nut 82. The core 80 is disposed in a manner to extend within the center of the coil 78, and to form a part of the inductor 77. The coil 78 is fixedly maintained within the tone arm 12 by means of an insulating bushing 84, a spring 86, and a spring retainer cover 88. The spring retainer cover 88 is secured to the tone arm 12 by means of screws 90.

It will now be understood that the inductance of the inductor 77, comprising the coil 78 and the core 80, will be a function of the displacement between the core 80 and the coil 78. In other words, the inductance of the inductor 77 will vary when the follower arm 14 moves with respect to the tone arm 12. It will also be understood that the inductance of the inductor 77 will remain unchanged as long as the stop 66 on the follower arm 14 is in contacat with the tone arm 12.

Means are provided for obtaining an indication, as a function of the inductance of the inductor 77, of changes in the inductance caused by the displacement of the core 80 with respect to the coil 78. To this end, the ends of the coil 78 are connected to an oscillator 92, through leads 94 and 96, in a manner whereby the inductor 77 provides the inductance that determines, at least in part, the resonant frequency of the oscillator circuit 92. Thus, the resonant frequency of the oscillator 92 will be:

$$f=\frac{1}{2\pi\sqrt{LC}}$$

where L is the inductance in henry's, C is the capacitance in farads, and $f$ is the resonant frequency in cycles per second. The output of the oscillator 92 is connected to any suitable detector, such as a detector 98 which may be a counting type frequency meter circuit adapted to indicate the frequency of an input sine wave.

A detector circuit of the type suitable for the detector 98 is illustrated in the book, "Electronic Measurements" by Terman and Pettit, McGraw Hill Book Company, Inc., 1952, page 228. The output of the detector circuit 98 may be indicated on a meter 100 connected to the detector circuit 98. Thus, it will be understood that any change in the displacement between the coil 78 and the core 80 will result in a change in the meter reading 100; and the meter reading 100 may be calibrated in units of length, instead of units of frequency, to indicate the aforementioned displacement. The stop 68 limits the maximum displacement between the coil 78 and the core 80.

The operation of the off-center indicator 10 in accordance with the present invention will now be explained. Let it be assumed that the phonograph record 36 is to be tested for eccentricity, that is, to check if the hole 55 in the record 36 is in the right place. The turntable 50 is caused to rotate and the bristles 34 of the brush 30 are caused to track the recording spiral, that is, the record grooves, of the record 36. The tone arm 12 will move toward the center of the record 36 as the record grooves are tracked. In other words, the tone arm 12 will move from a position indicated by the dashed outline to the position indicated by the solid outline in FIG. 1, over a period of time. In this process, the follower arm 14 will be pushed clockwise, looking at FIG. 1.

In the event that the hole 55 of the record 36 has been improperly placed, the tone arm will back up, that is, move away, from the follower arm 14. Because of the friction loading of the follower arm 14, the follower arm 14 will remain stationary when it is not pushed. The displacement between the coil 78 and the core 80 will change as a result of this back-up, and, therefore, change the frequency of the oscillator 92. This change in frequency of the oscillator 92 is detected by the detector circuit 98 and indicated on the meter 100 in calibrated units of length proportional to the aforementioned displacement.

In the event that a metal stamper is to be tested for eccentricity, the stamper will be rotated in a direction opposite to that for the record 36. The bristles 34 of the brush 30 will now track the recording spiral, that is, the ridges, of the stamper in a manner whereby the tone arm 12 will move toward the center of the stamper in the manner explained for testing the record 36.

While the off-center indicator of the present invention has been explained in detail with respect to means for varying the inductance of an inductor 77, comprising the core 80 and the coil 78, it will be understood that the instant invention is applicable for indicating small changes in electrical components where such changes are a function of the displacement of one part of the component with respect to another part of the component. For example, the core 80 may be considered one of the plates of a capacitor, and the coil 78 may be considered another plate of the capacitor. Under these conditions, the frequency of the oscillator 92 may be made a function of the capacity between the aforementioned two elements in a manner well known in the art. The displacement between the two plates of the capacitor may then be indicated in units of length on the output meter 100 of the detector circuit 98.

Thus, there has been shown and described, in accordance with the objects of the present invention, an off-center indicator for testing records and stampers wherein an indication is obtained on a meter during the back-up period of a tone arm; and wherein a constant, or reference, indication is obtained in the absence of any back-up of the tone arm.

What is claimed is:

1. An off-center indicator for indicating the eccentricity of a recording spiral on a disc recording, said indicator comprising a tone arm, a follower arm, a shaft, means pivoting said tone arm and said follower arm independently for rotation about said shaft, a stop fixed to said follower arm and adapted to touch said tone arm whereby said tone arm will push said follower arm when said tone arm is moved in one direction, means for rotating said disc recording, tracking means fixed to said tone arm and engageable in said recording spiral for moving said tone arm when said recording is rotating, an electrical component comprising at least two interacting parts and having an electrical characteristic whose value is a function of the displacement between said two parts, means to mount one of said parts on said tone arm, means to mount the other of said parts on said follower arm, said two parts of said component being in an interacting relationship over a relatively wide range of displacements from each other, and indicating means connected to at least one of said parts to indicate the displacement of said parts as a function of the value of said electrical characteristic.

2. An off-center indicator as defined in claim 1 wherein said two parts comprise a coil and a core therefor, and said electrical characteristic is the inductance of said coil, the value of said inductance varying with the displacement of said core from said coil.

References Cited in the file of this patent

UNITED STATES PATENTS

| | | |
|---|---|---|
| 2,288,838 | Pike | July 7, 1942 |
| 2,863,668 | Lathrop | Dec. 9, 1958 |